US009349252B2

(12) United States Patent
Guziel et al.

(10) Patent No.: US 9,349,252 B2
(45) **Date of Patent: *May 24, 2016**

(54) GAME TICKET SELECTION APPARATUS AND METHOD

(71) Applicant: Alchemy3, LLC, Alpharetta, GA (US)

(72) Inventors: Paul Francis Guziel, Roswell, GA (US); David Jason Schorr, Cumming, GA (US)

(73) Assignee: Alchemy3, LLC, Roswell, GA (US)

( * ) Notice: Subject to any disclaimer, the term of this patent is extended or adjusted under 35 U.S.C. 154(b) by 248 days.

This patent is subject to a terminal disclaimer.

(21) Appl. No.: 13/766,090

(22) Filed: Feb. 13, 2013

(65) Prior Publication Data

US 2013/0244745 A1 Sep. 19, 2013

Related U.S. Application Data

(63) Continuation of application No. 13/046,731, filed on Mar. 12, 2011, now Pat. No. 8,398,485.

(51) Int. Cl.

| | |
|---|---|
| ***G06F 17/00*** | (2006.01) |
| ***G07F 17/32*** | (2006.01) |
| ***A63F 3/06*** | (2006.01) |

(52) U.S. Cl.

CPC .............. *G07F 17/3262* (2013.01); *A63F 3/06* (2013.01); *G07F 17/329* (2013.01); *G07F 17/3241* (2013.01); *G07F 17/3251* (2013.01); *A63F 3/064* (2013.01)

(58) Field of Classification Search

USPC ........................................................ 463/16–31

See application file for complete search history.

(56) References Cited

U.S. PATENT DOCUMENTS

| | | | | |
|---|---|---|---|---|
| 6,760,476 | B2 | 7/2004 | Meder | |
| 6,899,621 | B2 | 5/2005 | Behm et al. | |
| 7,621,810 | B2 | 11/2009 | Gilmore et al. | |
| 7,824,259 | B2 | 11/2010 | Walker et al. | |
| 7,914,371 | B2 | 3/2011 | O'Brien | |
| 8,177,634 | B2 * | 5/2012 | Herrmann et al. .............. | 463/25 |
| 2004/0229677 | A1 | 11/2004 | Gray et al. | |
| 2005/0003884 | A1 | 1/2005 | Meyer et al. | |
| 2005/0197968 | A1 | 9/2005 | Das et al. | |
| 2006/0009275 | A1 | 1/2006 | Packes et al. | |
| 2006/0068877 | A1 | 3/2006 | Jeon | |
| 2007/0117609 | A1 | 5/2007 | White et al. | |
| 2010/0160035 | A1 * | 6/2010 | Herrmann ........................ | 463/25 |
| 2013/0237304 | A1 * | 9/2013 | Oakes et al. .................... | 463/16 |
| 2014/0349741 | A1 * | 11/2014 | Boykin ........................... | 463/25 |

* cited by examiner

*Primary Examiner* — Ronald Laneau

(74) *Attorney, Agent, or Firm* — Baker, Donelson, Bearman, Caldwell & Berkowitz, PC

(57) ABSTRACT

A method and system for a player to select numbers for a game ticket for play of a random draw game by displaying available game tokens on a display screen of a mobile computer device, selecting a pre-determined number of the available game tokens, and communicating the selected game ticket to a controller for the random draw game.

32 Claims, 8 Drawing Sheets

GAME TICKET SELECTION APPARATUS AND METHOD

TECHNICAL FIELD

The present invention relates to apparatus and methods by which random draw game tickets are provided to players. More particularly, the present invention relates to apparatus and methods by which a player of a random draw game may obtain a game ticket to play a random draw game.

BACKGROUND OF THE INVENTION

Game tickets for random draw games are provided to players through the retail market using authorized ticker vendors. The vendors are often quick stop retail convenience stores having impulse-type point-of-purchase cashier stations, but may be also be stand-alone kiosks or cashier stations in other retail establishments. The vendors operate a random game terminal that has a communications link with the provider of the random draw game. The game terminal includes a printer on which game tickets are printed for the player. The game ticket includes printed information about the game ticket. This information typically includes a grid of the game numbers for play on the game ticket, as well as information as to the sales date and time and the date of the game to be played. The game ticket also displays a unique authorization or identification code associated with the game ticket. This code may be used to verify the authenticity of the game ticket in the event the game ticket is randomly selected to be a winning ticket in the random draw game. Often the game ticket encapsulates the game ticket information into a machine readable code printed on the ticket. The game terminal may include a scanner configured to read the code so that the terminal may interpret the code and generate a digital representation of the game ticket information.

Players may select to have a ticket issued for particular numbers specified by the player or alternatively have the ticket issued with randomly generated numbers. The player specifies the numbers for a game by entering the numbers on a game number sheet. The terminal receives the game number sheet in a document reading scanner and prepares the game ticket for the player.

While the present ticket distribution apparatus and methods provide for players of random draw games to obtain game tickets, there are drawbacks to such. The game slip is manually completed. A ticket generated following an incorrect scan must be destroyed, unless the player decides to keep the ticket. Of course, random generated numbers do not have that problem. However, random generated game tickets do not permit a player to observe the random numbers and then manually remove one or more such numbers for a number selected by the player.

Accordingly, there is a need in the art for an improved apparatus and method by which a player of a random draw game may obtain a game ticket selectively for play during the game. It is to such that the present invention is directed.

BRIEF SUMMARY OF THE INVENTION

The present invention meets the need in the art by providing a method for selecting by a player numbers for one of a plurality of game tickets for a random draw game for play during play of the game during which numbers are selected at random as winning numbers, and a player in possession of a game ticket with numbers matching the selected winning numbers wins a prize, comprising the steps of:

(a) selecting by a player one of at least two criteria options for at least one criteria for a game ticket for play in a random draw game, which criteria and selectable criteria options are displayed on a screen of a mobile computer device;

(b) selecting by a player a pre-determined number of game tokens from a plurality of available game tokens displayed on the screen of the mobile computer device, which selected game tokens are associated with the game ticket for the player;

(c) generating an encapsulated code representative of the criteria and game tokens selected by the player for the game ticket for play during the random draw game;

(d) communicating a digital representation of the encapsulated code to a random draw game controller having a database of tickets authorized for play during the random draw game to authorize the game ticket selected by the player; and (e) verifying to the player the authorization of the game ticket selected by the player.

In another aspect, the present invention provides a system for selecting by a player numbers for one of a plurality of game tickets for a random draw game, during which winning numbers are selected randomly and a player in possession of a game ticket having numbers that match the selected winning numbers wins a prize. The system includes a mobile computer device having a screen that displays at least one criteria for a game ticket for play in a random draw game, which criteria has at least two criteria options for a player to select at least one of the criteria options for the game ticket. The screen displays a plurality of available game tokens for the player to select a pre-determined number of game tokens for the game ticket. A microprocessor configured with instructions that upon execution generate an encapsulated code representative of the criteria and of the game tokens selected by the player for the game ticket for play during the random draw game. The selected game ticket criteria and selected game tokens are provided to a random draw game controller having a database of game tickets authorized for play during the random draw game to authorize the game ticket selected by the player.

Objects, features and advantages of the present invention will be apparent upon reading the following detailed description in conjunction with the drawings and the appended claims.

DETAILED DESCRIPTION

Figure 1:
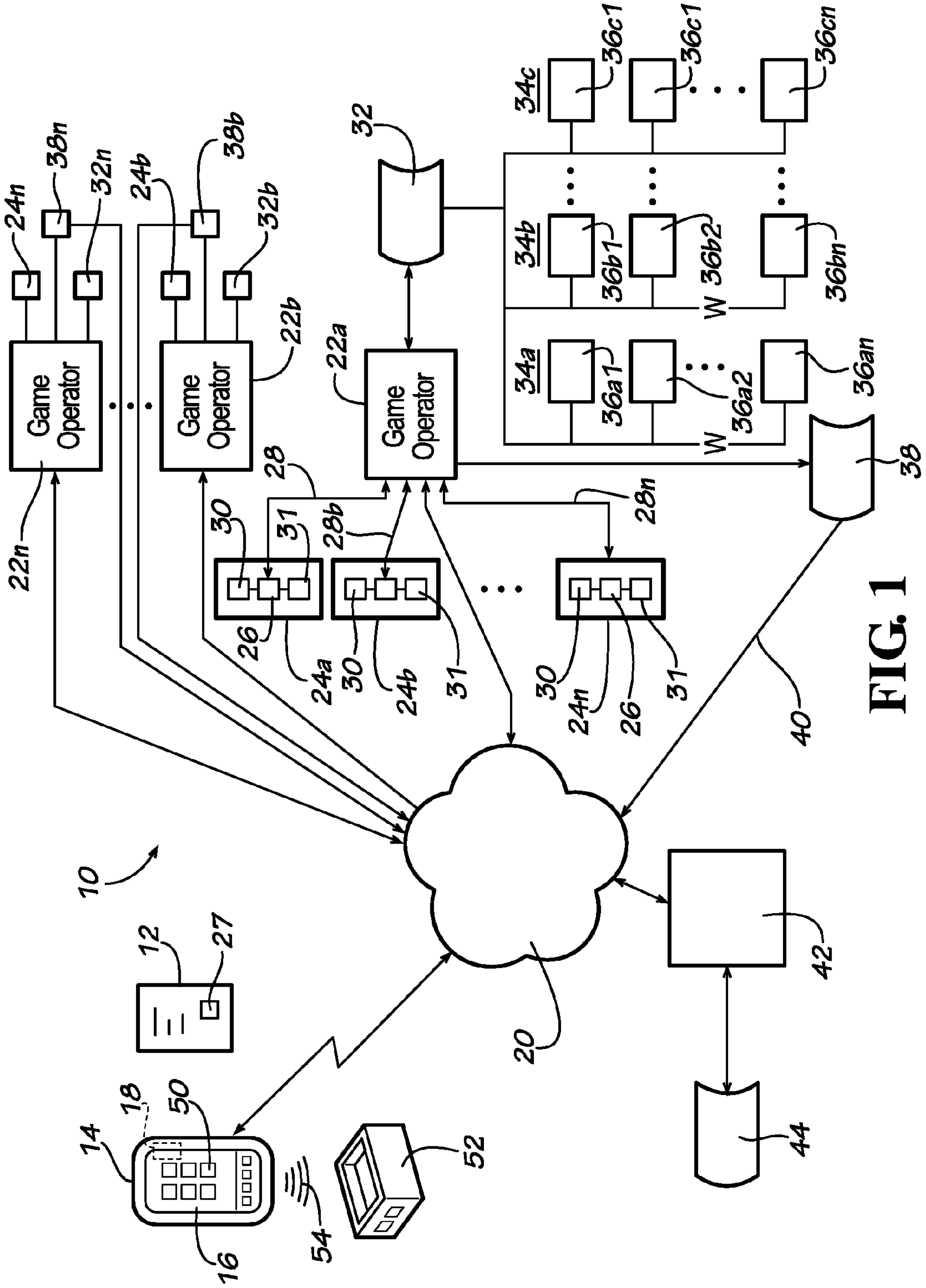
FIG. 1 illustrates a schematic view of an apparatus by which a player selects a ticket for play in a random draw game.

With reference to the drawings, in which like parts have like identifiers, FIG. 1 illustrates a schematic view of an apparatus 10 by which a player selects a ticket 12 for play in a random draw game. The player selects the ticket 12 using a mobile computer device 14 having a display 16 and a communications device 18 that enables communications through a network 20 with one of a plurality of game operators 22. Typically, game operators 22 sell tickets for play in the random draw games through a plurality of ticket sellers 24. Each ticket seller 24 uses a terminal 26 that communicates 28 through a communications device with the game operator 22. In addition, the terminal 26 also communicates with a printer 31 for printing the game ticket 12 for the player. The printed game ticket 12 includes game information (game name, play date), ticket price, and numbers to be played during play of the random draw game. The game ticket also displays a printed code 27 that encapsulates the game information for the ticket 12. The terminal 26 includes a scanner 30 configured for interpreting codes printed on game tickets.

One use of the scanner 30 is to validate game tickets 12 presented by players after a drawing of winning numbers in the random draw game. The scanned code 27 from the presented ticket communicates through the terminal 26 to the game operator 22. The game operator 22 maintains a database 32 of the results of random draw games. In the illustrated embodiment, the game operator 22 operates a plurality of games 34. The database 32 includes a data record 36 for each play of the particular game and the winning ticket numbers for that played random draw game. The database 32 accordingly includes a plurality of records 36 each associated with a respective one of the games 34 and for the play date for the game. In the illustrated embodiment, the respective records are designated by 36 followed by an alpha and numeric character, where the alpha character represents the particular game and the numeric character indicates the particular play of that game on various dates.

The database 32 of the game operator 22 is maintained with secure communication links, as customary in the trade. Nevertheless, the game status and winning numbers associated with each particular game are public. In the illustrated embodiment, the game operator 22 may provide a public access database 38 accessible by a communication link 40 to the network 20. For example, a player may access from a remote computer or mobile computer device the public information related to winning tickets through the worldwide web. In one embodiment, the game operator 22 maintains the database 38; in an alternate embodiment, an independent information providers maintains the database 38 (or alternatively, another database 42 discussed below).

FIG. 1 further illustrates other of the plurality of game operators 22. Each game operator 22*b*, . . . 22*n* (as illustrated) may include the database 32 with winning numbers of games offered to players. The same operators may also provide access to publicly available information about the games of the game operator and the winning numbers generally 38, such as a database or other publicly accessible source of winning status information.

In one aspect of the present invention, a central application provider 42 maintains a separate database 44 of games 34 and winning ticket status 36 for each game operator 22. The application provider 42 facilitates a player verifying ticket status by accessing game and drawing information, as discussed below.

In accordance with the present invention, the mobile computer device 14 is configured with an application 50 of computer software code. The display 16 displays a linked icon which provides access to the executable code. Upon execution the player uses information shown on the display 16 to select a game ticket 12 for play in a selected game 34 of a game operator 22. After the ticket 12 is selected and authenticated by the game operator 22, the player may selectively print a copy of the game ticket 12 using a remote printer 52. In the illustrated embodiment, the remote printer 52 is connected wirelessly 54 to the mobile computer device 14. In an alternate embodiment, an electronic game ticket may also be downloaded to a personal computer for printing conventionally.

Figure 2:
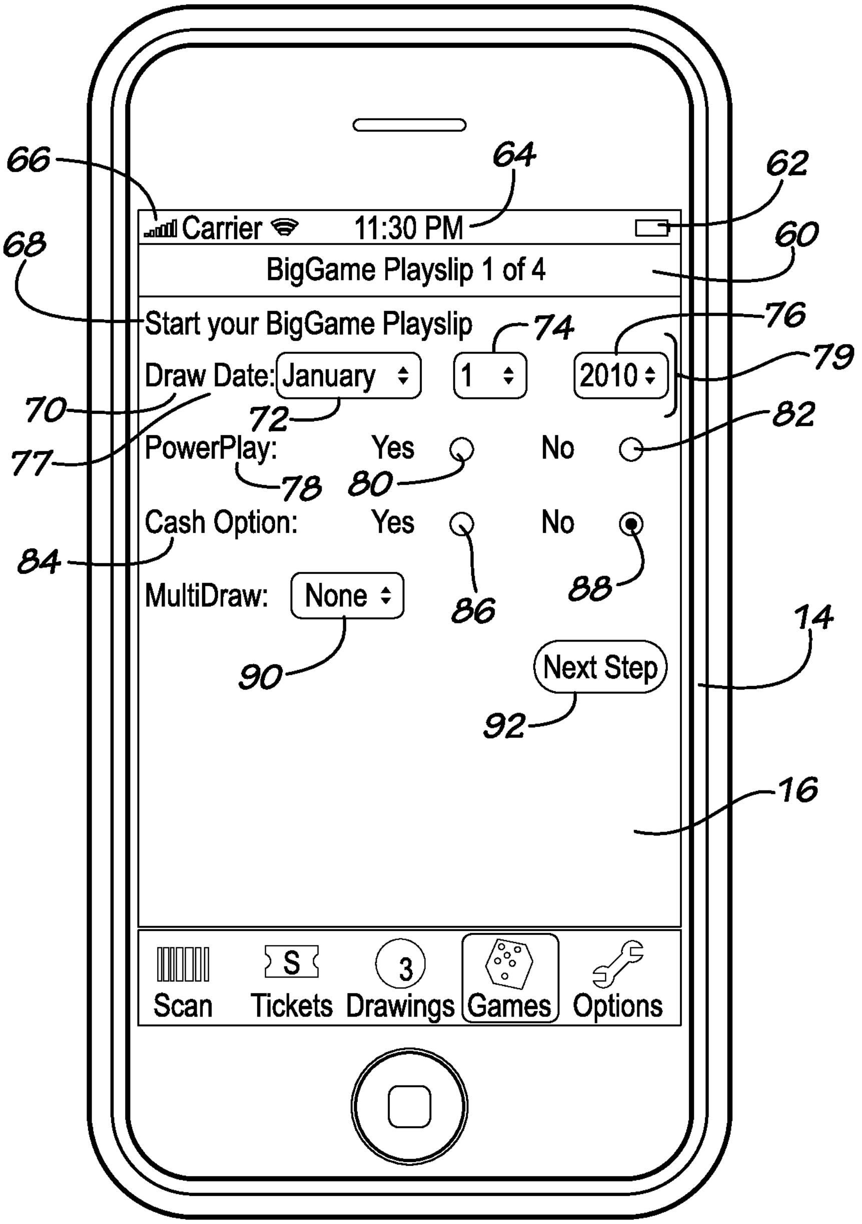
FIG. 2 illustrates mobile computer device for configured for interactive selection of a ticket for a random draw game in accordance with the present invention.

FIG. 2 illustrates the mobile computer device 14 during execution of the application 50 by which the player selects a game ticket 12. The display screen 16 includes an application title 60 as well as other conventional information associated with a mobile computer device including available power or battery supply 62, date 64 and wireless communication signal strength and service provider 66. The display 16 includes instructions 68 by which a player starts the selection process for the game ticket 12. The display 16 includes a draw date 70 including selectable month 72, day 74, and year 76 of the random draw game to be played.

The screen 16 includes at least one criteria generally 77 for the ticket selected by the player for play in the random draw game. The criteria 77 include at least two criteria options generally 79 for selection by the player. The criteria 77 may include the game draw date as well as selectable features of the random draw game.

The illustrated embodiment displays two criteria for the ticket and options for selection by the player. A first option provides the player with an opportunity to increase the value of a winning prize, such as a "power play" selection 78. The player is provided with selectable yes 80 and no 82 options. The options 80, 82 are mutually exclusive such that one of the options must be selected. A radio button adjacent the criteria option changes (such as color or symbol in the button) to indicate the selected option. Alternatively, criteria may have several selectable options. In addition, the random draw game in the illustrated embodiment provides the player with a second selectable option of a cash payout 84 for a winning ticket, with similar yes 86 and no 88 radio buttons. If a cash payout is not selected, winnings if any may be paid as an annuity. A multi-draw window 90 enables the player to specify one or more sets of drawing numbers to be included on the game ticket 12. A next step button 92 instructs the application code 50 to present the pool of available numbers for selection by the player; as shown in FIG. 3.

Figure 3:
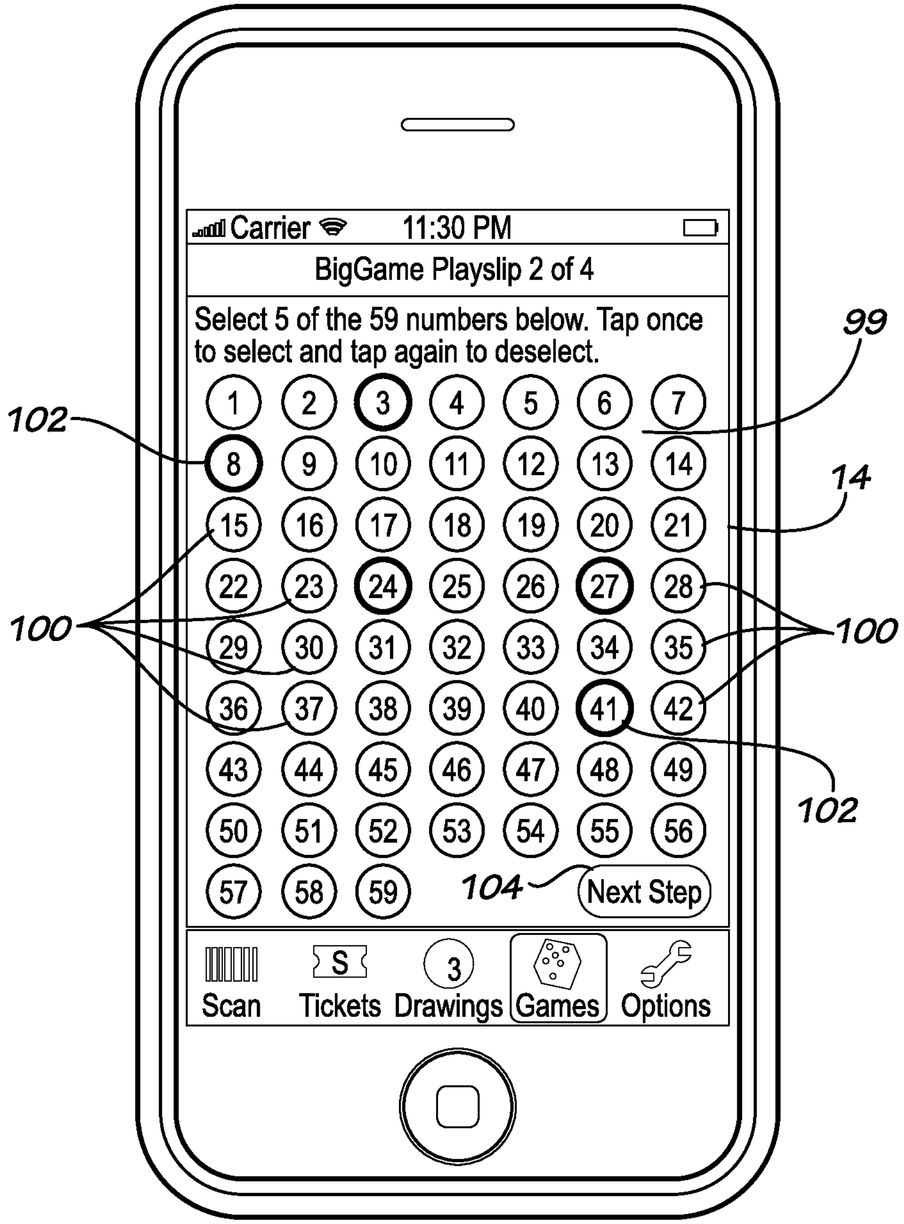
FIG. 3 illustrates the mobile compute device displaying available game tokens and game tokens selected for the game ticket by the player using the mobile computer device in obtaining a game ticket for play in the random draw game.

FIG. 3 illustrates the mobile computer device 14 displaying a field 99 of available game tokens 100 (or numbers) for selection by the player to include in the drawing ticket 12 of the random draw game. In the illustrated embodiment, the player selects five of fifty-nine numbers from the field of numbers or game tokens 100 shown on the display 16. In the illustrated embodiment, the player taps once on one of the game tokens 100 to change the game token to a selected game token 102. The selected game tokens 102 are displayed distinctively so that the player can distinguish selected tokens 102 and unselected tokens 100. In the illustrated embodiment, selected tokens 102 are designated by a color different than the display of the available tokens 100 and also by a dark ring placed around the selected game token 102. A selected game token 102 can be deselected by tapping the screen 16 to change its status from selected to available. A next step button 104 transfers control to a subsequent screen for continuing the selection and authentication process for picking the game ticket 12. If the player has selected fewer numbers than are required for the game, the display 16 presents an alert message, which upon acknowledgement by the player, returns the player to the screen shown in FIG. 3 to complete selecting the game numbers.

In an alternate embodiment, a random selection button (not illustrated) may be operated. The random selection button randomly selects the five numbers to be included for the game ticket 12. These randomly selected numbers are similarly depicted in changed color and highlighting in the field of game tokens 100. The player may deselect a selected game token 102 and select an alternate one of the available game tokens 100 using the tapping process described above. A next step button 104 transfers to the portion of the selection process.

Figure 4:
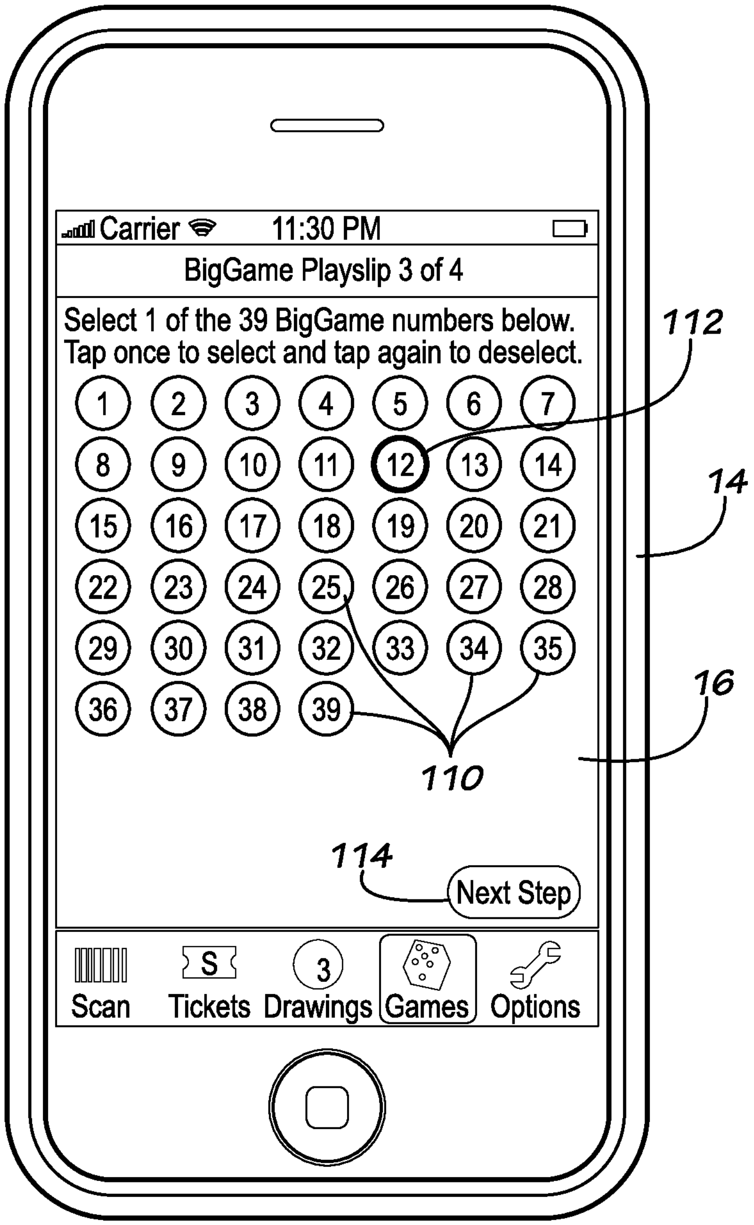
FIG. 4 illustrates the mobile compute device displaying available game tokens for an additional feature of the random draw game for selection by the player using the mobile computer device.

FIG. 4 illustrates the mobile computer device 14 displaying selectable information for an additional feature of the random draw game. In the illustrated embodiment, the game 34 offered by the game operator 22 includes an increased payout feature. The player selects one or more (depending on the particular game) of numbers from a pool of available numbers. If the number selected by the player for this feature is a winning number drawn for the feature in the random draw game, the payout is increased. The screen 16 displays a field of selectable increased payout game tokens 110. The player selects one 112 of the game tokens 110 for the power ball feature. In the illustrated embodiment, thirty-nine numbers are available as game tokens 110. The player selects one. The player selects one of the available game tokens 110 by tapping the screen 16 in alignment with a particular one of the game tokens 110. The selected game token 112 is designated by a changed color and by a ring encircling the displayed selected number. The player may deselect the number by tapping the selected number 112 and selecting another one of the available game tokens 110. A next step button 114 directs the application 50 to finish the selection process. If the player has selected this feature but attempts to transfer before selecting the game token 112, an alert message displays on the display 16. Upon acknowledgement, the selection screen shown in FIG. 4 is re-displayed.

Figure 5:
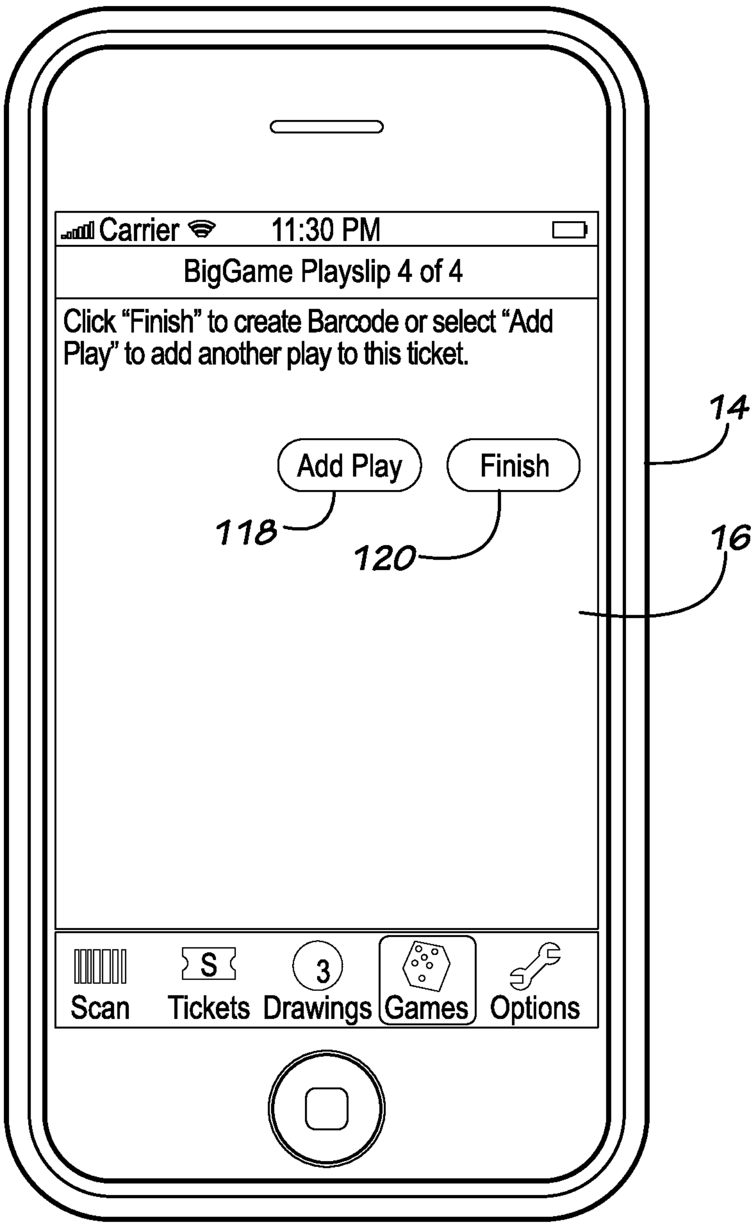
FIG. 5 illustrates a display on the mobile computer device during selection of the game ticket.

FIG. 5 illustrates the display 16 on the mobile computer device 14 for selecting the game ticket 12 by the player. An add play button 118 enables the player to add an additional drawing to the game ticket. Upon executing the add play button 118, control transfers back to the screen shown in FIG. 2 for processing the selected drawing criteria for the additional drawing on the game ticket 12 being selected by the player. The selection may include the displays shown in FIGS. 3 and 4 as discussed above. A finish button 120 transfers processing to the step of encoding the selected game tokens and criteria for the game ticket 12 and authorizing the game ticket with the game operator 22.

Figure 6:
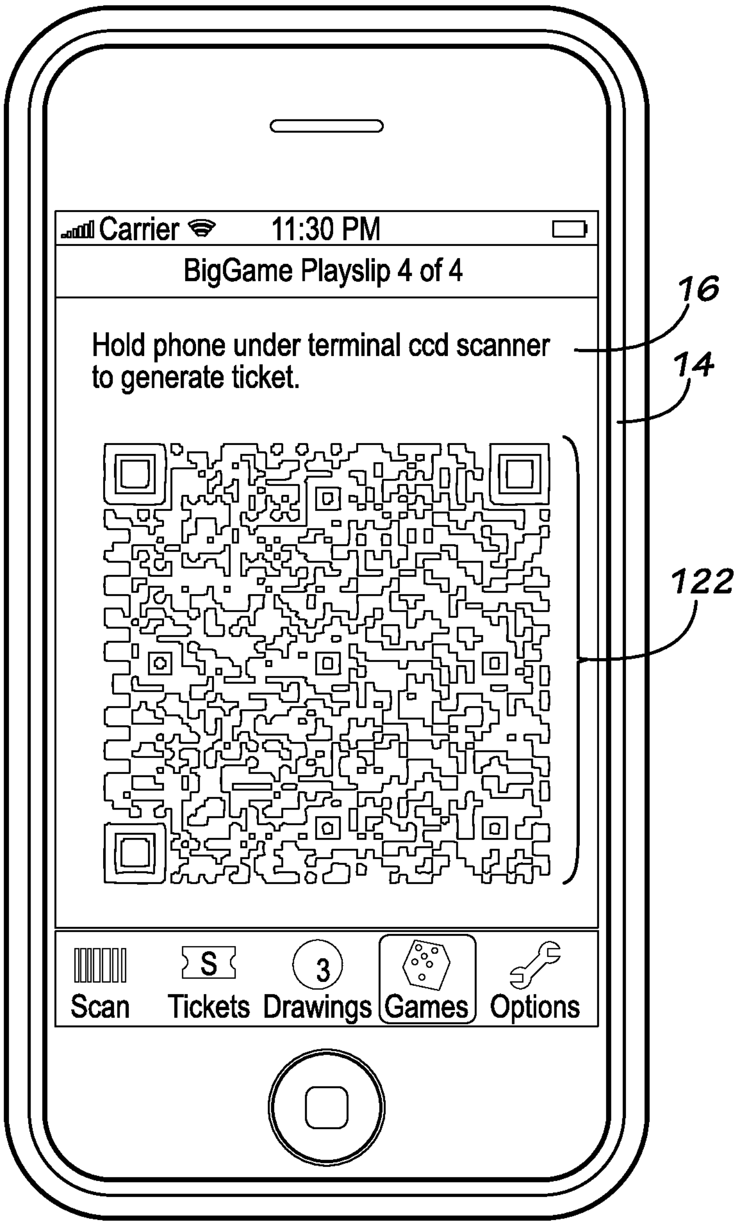
FIG. 6 illustrates the mobile computer device displaying a graphic image of the encoded selected game ticket for imaging during game ticket issuance in accordance with one embodiment of the invention.

FIG. 6 illustrates the mobile computer device 14 displaying on the screen 16 an encapsulated code 122 representative and interpretable of the selected game tokens 102, 112 and criteria for the game ticket 12. In the illustrated embodiment, the encapsulated code 122 is a two-dimensional QR code. Other encapsulating codes, for example Datamatrix or PDF417, may be used. In one aspect of the present invention, the player holds the mobile computer device 14 for imaging of the screen 16 by the scanner 30 at the ticket seller 26. The terminal 26 interprets the scanned code 122 and communicates a digital representation 150 of the code 122 to the game operator 22. It is to be appreciated that the mobile computer device 14 may provide an identifier associated with the device 14 for enabling communication between the device and the operator 22. Upon authentication of the ticket 12 by the game operator 22, the game operator returns an authorized game ticket 12 to the terminal 26. The ticket seller 24 then prints the game ticket selected by the player using the printer 31 connected to the terminal 26.

In an alternate embodiment, the application 50 communicates the digital representation 150 of the encapsulated code 122 (together with the identifier of the mobile computer device 14) directly through the network 20 to the game operator 22. The game operator 22 similarly authenticates the requested game ticket selected by the player.

Authentication of the selected game ticket 12 includes the game operator 22 making a record for validation purposes of the selected game ticket 12. In one aspect, the game operator 22 generates a unique identifier or authentication number that is associated with the ticket 12. The unique identifier is included in a revised digital representation of the game ticket information, and the revised digital representation is the re-encapsulated into a two dimensional machine readable code. The revised digital representation or the encapsulated code may communicate from the game operator 22 to the mobile computer device 14 of the player.

Figure 7:
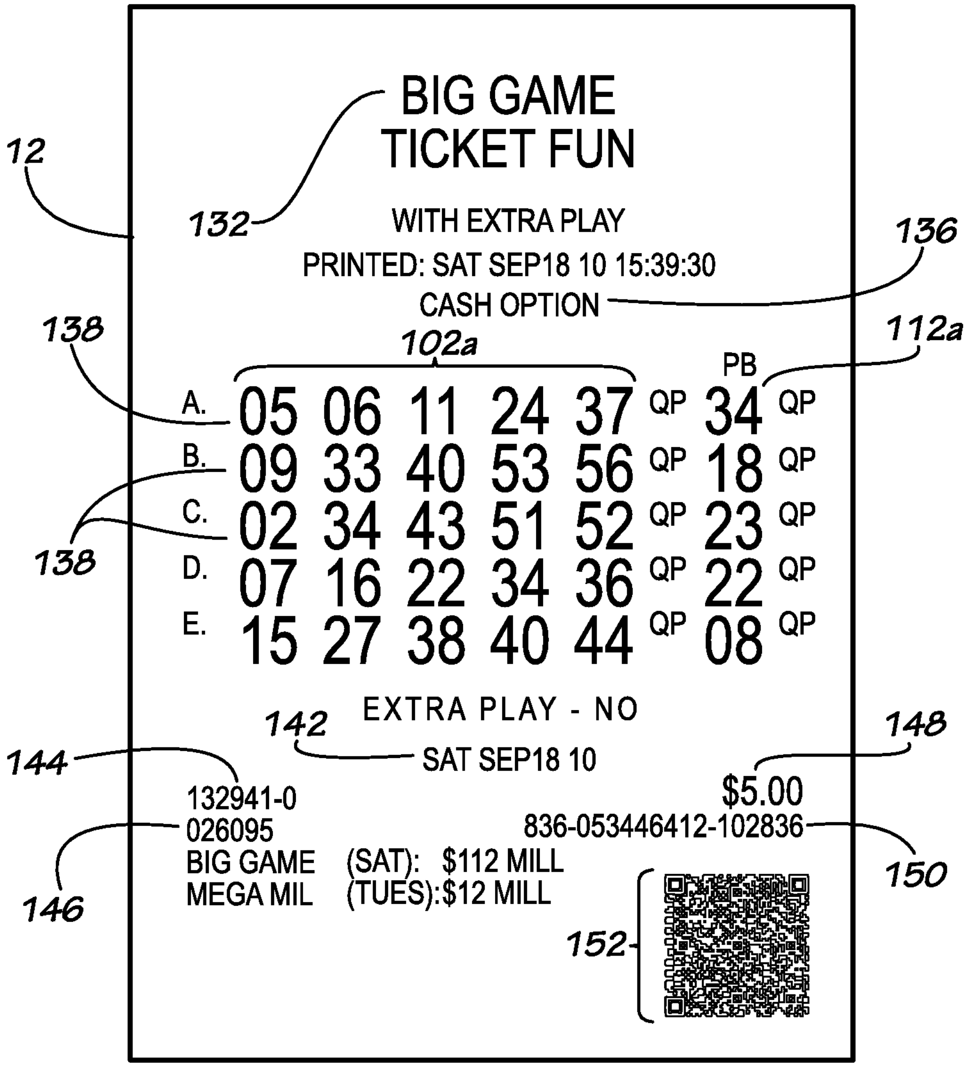
FIG. 7 illustrates a printed game ticket issued by the random draw game controller as selected by the player for play in the random draw game.

FIG. 7 illustrates the game ticket 12 with printed game ticket information. Game tickets 12 conventionally display a game name 132, a date purchased 134 (or printed), an option criteria 136 for cash payout or annuity payout, one or more rows 138 of selected game numbers 102, and a selected number 112 for the increased payout feature. FIG. 7 illustrates five plays of the game (rows 138 marked A-E). The game ticket 12 displays a drawing date 142 for the game, a game number 144 (assigned by the game operator), a game code 146, a purchase amount 148, and the unique identifier 150 assigned by the game operator 22 when the game ticket is purchased and authenticated. The game ticket includes a code 152 that encapsulates the game information. In the illustrated embodiment, the code 152 is a two-dimensional QR code.

Figure 8:
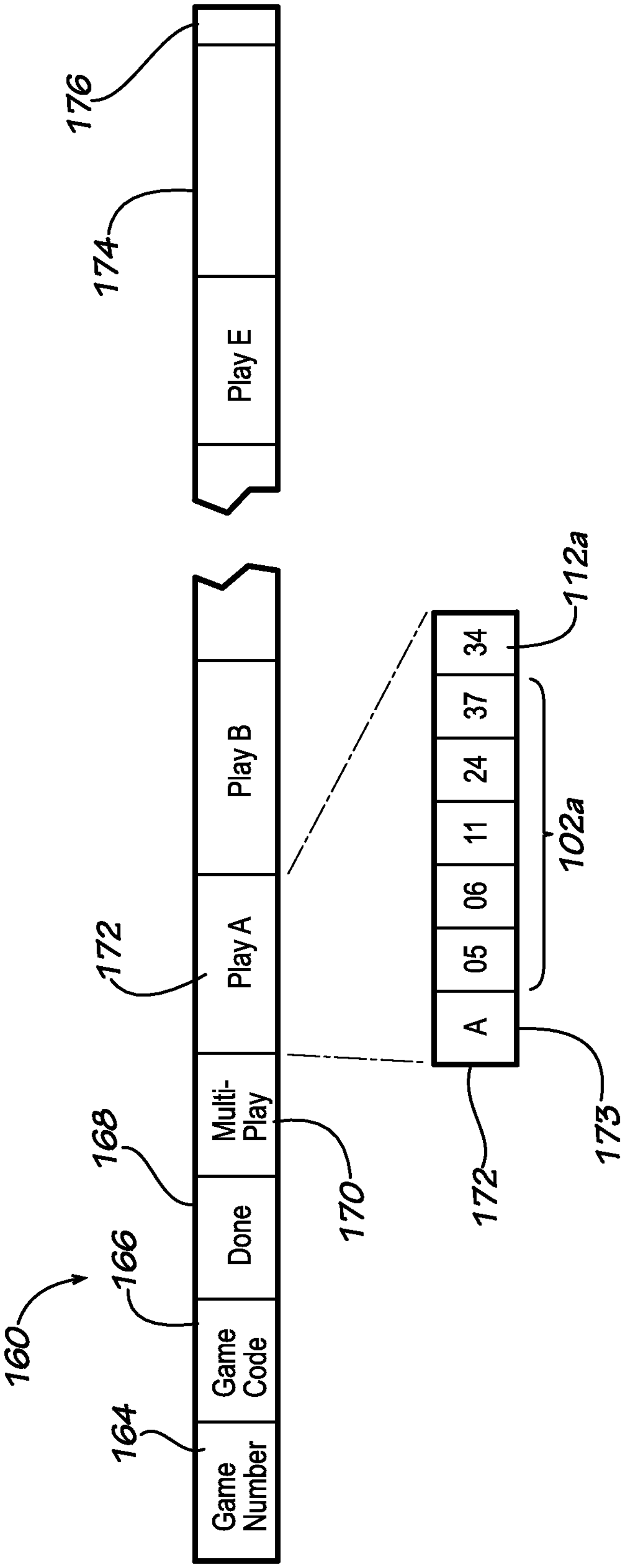
FIG. 8 illustrates a digital representation and encapsulated representation of the selected game ticket.

FIG. 8 illustrates a digital representation record 160 of the selected game ticket 12 such as would be maintained in the database 32. Digital and encapsulated representations are translated through operation of conventional imaging devices and encapsulating systems. For example, an encapsulated representation may be imaged by a camera of a mobile computer device or cellular telephone. The encapsulating system includes, for example, Apache Licensed Open Source ZXING barcode libraries project implemented by Google.

As shown in FIG. 8, digital representation 160 includes a game number field 164 that holds the game number 144, a game number field 166 that holds the game code 146, and a date field 168 that contains the play date of the random draw game. In the illustrated embodiment, the date field is expressed in a MMDDYYYY format. A multiple play field 170 includes the number of consecutive drawing dates on which the selected ticket 12 is to play. The illustrated embodiment represents the multiple play field 170 as a two digit number. Many random draw lottery games permit players to play up a plurality of consecutive drawing game play dates on a single ticket. The digital representation also includes at least one set 172 of game tokens for a play of the random draw game, with as many sets 172*a* . . . 172*n* as the player selects to include on the single ticket. Each set 172 includes a defined pattern of the selected game tokens and feature token that correspond to the game tokens selected by the player for the play on the game ticket 12.

Although not illustrated, other features of the particular game may be included in the digital representation including exotic combinations or add-ons as features. For example, some commercial random draw games have "Daily Games" of a "pick 3" or "pick 4" number games. These games may also have upgrade purchase combination features that will pay off with different winnings in the event of specific outcome. Some of these games and features are known commercially as "Back Pair" or "Combo" plays. Such exotic features can be represented in field provided for 2 digit number codes. The actual number selections 102 for each individual play 172 are included. A lottery ticket could have up to five different plays on a single ticket. Each play is separated by an alpha character 173.

A unique identifier field 174 contains the unique identifier 150 assigned by the game controller 22. An end of string delimiter 176 may be used to terminate the digital representation of the game ticket 12.

It is to be appreciated that the numbers (both alphanumeric for base 16 for example and numeric) encapsulated in the digital and two dimensional encapsulated code representations will vary based on the specifics of the ticket. The more characters to be encapsulated, the denser and more complex the code becomes.

As discussed above in relation to FIG. 8, a 'fixed position' string permits reducing the number of characters, and the interpretation interface is configured with logic to evaluate the representation whether digital or encapsulated form. Further, field delimiter characters may be used, although the interpretation interface may be configured for eliminating the need of delimiters.

In an embodiment using a fixed position digital representation, the intrepration system is configured to locate the game number in positions 1-6. Using 'if-then-else' statements the method employs the necessary logic to determine the content or value for the rest of the positions. For example, if the game MEGAMILLIONS is assigned number "123456", the system is would be configured for a game ticket in that random draw game. That means that the selection for each draw will contain six 2-digit numbers and the sixth number in each selection will be the "MegaBall". Suitable configurations are prepared for each different random draw game.

Once the communicated digital representation 160 is analyzed, the representation is recorded in the remote server database 34 and is associated with the mobile computer device that delivered the representation using the identifier of the device 14.

In another aspect, the game controller database 32 may include a corresponding table within that same database that houses the results information for each lottery game draw. Using the unique data for each record, the server side application may periodically search for 'results' information in the table that matches each 'ticket record'. When a drawing date in the game play record matches with the play date of a ticket record, the server side application compares the results to the numbers selected for the ticket. Using the mobile device identifier, the application returns the ticket results to the origin mobile phone device 14, for example, if the ticket has a winning status. In addition to the software instructions code developed for the mobile phone application 50 and the remote server side database 32, additional software code must be created for the lottery system terminal to create the number string and convert to the two-dimensional code. A QR Code generation application can be licensed to convert the string into the QR Code image. But this software add-on eliminates the need to transfer all the purchased ticket information to the remote server in order to provide results back to the mobile computer device.

With reference to FIG. 1, the player causes the application 50 loaded into the mobile computer device 14 to execute in order to select the game ticket 12. One of a plurality of available games may be selected. As shown in FIG. 2, the display screen 16 presents the game play options for selection by the player. This includes the draw date generally 70 (selected by moving conventional date adjust fields for the month 72, the day 74, and the year 76). Other game critera 77 or features such as increased value and cash payout are presented with selectable options 79 for selecting by the player for the game ticket 12. In the illustrated embodiment, the next step button 92 transfers to the selection of the game tokens.

As shown in FIG. 3, the display screen 16 presents to the player the pool of available game tokens 100. The player selects game tokens for play on the ticket 12. This is accomplished, for example, by tapping the screen 16 (configured as a touchscreen) in alignment with the selected game token. The display of the selected game token is changed from the first presentation to the second presentation. This change in display presentation indicates to the player that the game token 102 has been selected. In the illustrated embodiment, the color of presentation changes and a ring is displayed around the selected game token. Upon completion of the selection of the proper number of game tokens 102, the next button 104 transfers to selecting additional features of the ticket 12.

For example, additional game features are similarly selected. As shown in FIG. 4, a feature for increased payout presents the pool of game token numbers 110 and the player selects one game token 112. The next step button 114 transfers to completing the game ticket, as shown in FIG. 5

In the illustrated embodiment, the add play button 118 of FIG. 5 enables the player to add another game to the game ticket 12. This involves presenting the game feature selection options and game tokens as discussed above. The finish button 120 of FIG. 5 completes the ticket selection. The selected game criteria and tokens are encoded into the digital representation 160 for converting to the encapsulated representation.

First, the selected ticket information communicates from the mobile computer device 14 to the game operator 22. In one embodiment shown in FIG. 6, the player holds the mobile computer device 14 for imaging of the display 16 by the scanner 30 at the ticket seller 24. The terminal 26 interprets the scanned code 122 and communicates the digital representation of the code to the game operator 22. In an alternate embodiment, the mobile computer device 14 is configured with a near-field communications device for communicating the digital representation wirelessly directly to a communications device of the terminal. Upon authentication of the ticket 12 by the game operator 22, the game operator returns an authorized game ticket 12 to the terminal 26. The ticket seller 24 may then print the game ticket selected by the player using the printer 31 connected to the terminal.

In an alternate embodiment, the application 50 communicates the encapsulated code 122 directly from the mobile computer device 14 through the network 20 to the game operator 22 with the device identifier for communications. The game operator 22 similarly authenticates the requested game ticket 12 selected by the player. The game operator 22 generates the unique identifier 150 and records the game ticket 12 in association with the identifier of the mobile computer device 14. The digital representation 160 is revised to include the unique identifier 150. The game operator 22 communicates the revised representation to the mobile computer device 14. The encapsulated digital representation may be displayed, stored in the memory of the mobile computer device with the game ticket information, or included on a printed version of the game ticket.

Suitable payment for the ticket 12 may be made, for example cash transfer from the player to the ticket retailer. An alternate embodiment uses a conventional third-party payment transfer system that displays account information and payment authorization buttons on the display screen of the mobile computer device, using an account maintained by the player for payment purposes, or using an account maintained by the game operator for the player.

In an alternate embodiment, the player may select game tokens or numbers for one or more plays of the random draw game, and save the selected plays in a memory device of the mobile computer device as a saved selected game play. The save selected game play is thus a potential game ticket. Subsequently, the player may recall the saved selected game play for communication of the play information to the game operator for authentication by the game operator as a game ticket for play during the random draw game. This may be accomplished by the player having the display 16 showing the encapsulated ticket information of the recalled saved selected game play scanned by the scanner 30 or the ticket information communicated to the game operator for example by the near-field communications device communicating with the terminal or otherwise communicating the information to the game operator.

The apparatus and methods disclosed herein can be made and executed without undue experimentation in light of the present disclosure. While the apparatus of this invention have been described in terms of illustrated embodiments, it will be apparent to those of skill in the art that variations may be applied to the apparatus and in the process described herein without departing from the concept, spirit and scope of the invention. All such similar substitutes and modifications apparent to those skilled in the art are deemed to be within the spirit, scope and concept of the invention as defined by the appended claims.

What is claimed is:

1. A method for a player having a mobile computer device configured to communicate through a communications network with a game provider that offers a random draw game and maintains a database of game tickets selected for play in the random draw game, to select in advance of the play of the random draw game by the game provider a game ticket having tokens for play during play of the random draw game in which the game provider selects tokens randomly as winning tokens so that the player in possession of a game ticket having tokens that match at least some of the winning tokens wins a prize, comprising the steps of:

(a) displaying on a screen of the mobile computer device during communication through the network with the game provider an icon of the random draw game for which a game ticket for play is to be selected;

(b) presenting on the display of the mobile computer device a plurality of available game tokens in a first representation to indicate available for selection for play in the random draw game;

(c) selecting by the player using the mobile computer device a pre-determined number of game tokens for the game ticket for play of the random draw game from the plurality of available game tokens displayed on the screen of the mobile computer device, which selected game tokens are for associating with the game ticket for the player;

(d) the mobile computer device communicating a representation of the game tokens selected by the player for play of the game ticket during the play of random draw game to the game provider and an identifier of the mobile computer device;

(e) the game provider using a random draw game controller updates a database of game tickets authorized for play during the random draw game with the game tokens selected by the player and with the identifier of the mobile computer device to authorize the game ticket for the player; and (f) the game provider communicating a verification to the player of the authorization of the game ticket selected by the player, whereby the player presents the verification for redemption of a winning game ticket.

2. The method as recited in claim 1, further comprising the step of generating an encapsulated code representative of the game tokens; and step (d) comprises communicating the encapsulated code.

3. The method as recited in claim 2, wherein the encapsulated code communicates as a digital representation thereof.

4. The method as recited in claim 1, wherein the random draw game has at least two criteria options for at least one criteria for the random draw game, which criteria and criteria options are displayed on the screen of the mobile computer device for selection by the player.

5. The method as recited in claim 4, wherein one of the criteria for the random draw game comprises a quick-pick option by which the pre-determined number of game tokens are randomly selected for the game ticket, wherein step (b) selecting comprises the player selecting the quick-pick option.

6. The method as recited in claim 5, further comprising upon a touching by the player of one of the unselected game tokens displayed on the mobile computer device, the step of changing the first representation thereof to a second representation.

7. The method as recited in claim 4, further comprising the step of generating an encapsulated code representative of the criteria and game tokens selected by the player; and step (d) communicating the encapsulated code to the random draw game controller.

8. The method as recited in claim 1, wherein step (d) comprises scanning a two dimensional code displayed on the screen of the mobile computer device, which code is representative of the selected game tokens, by a scanner at a game ticket provider and the game ticket provider communicating the scanned code to the game controller.

9. The method as recited in claim 1, wherein step (f) verifying comprises the game ticket provider printing a game ticket upon instruction by the game controller.

10. The method as recited in claim 1, wherein step (d) communicating comprises the player connecting with the mobile computer device through the network with the random draw game controller.

11. The method as recited in claim 10, wherein step (f) verifying comprises the game controller communicating to the mobile computer device a digital representation of the game ticket selected by the player which digital representation further includes an authorization code generated by the game controller.

12. The method as recited in claim 1, wherein step (b) selecting comprises the display screen configured as a touchscreen device and displaying the available game tokens in a first representation, the player selecting the selected one of the game tokens by touching the touchscreen display in alignment with the selected one of the game tokens, and the display screen changing the display of the selected one of the game tokens to a second representation.

13. The method as recited in claim 12, wherein the first representation is a first color and the second representation is second color.

14. The method as recited in claim 12, further comprising the player touching one of the selected game tokens to unselect and change the selected game token to an available game token, and the display changing the touched selected game token from the second representation to the first representation.

15. The method as recited in claim 2, wherein the encapsulated code is a two-dimensional bar code.

16. The method as recited in claim 1, wherein the step (f) verifying comprises the random draw game controller communicating an unique authorization code to mobile computer device that stores the authorization code in a memory device.

17. A system for a game provider providing random draw games for play communicating through a communications network with a player having a mobile computer device configured for selecting, in advance of the play of the random draw game by the game provider, by the player tokens for play on a game ticket for the random draw game that during play the game provider selects tokens randomly as winning tokens so that the player in possession of the game ticket having tokens that match at least some of the winning tokens wins a prize, comprising:

(a) the mobile computer device configured for displaying on a screen an icon of the random draw game for which a game ticket for play in the random draw game is to be selected;

(b) the mobile computer device configured for displaying on the screen a plurality of available game tokens for selecting therefrom a pre-determined number of game tokens for the game ticket;

(c) a network for communication by the mobile computer device of a representation of the selected game tokens with an identifier of the mobile computer device to a random draw game controller operated by the game provider, the game controller maintaining a database of game tickets authorized for play during the random draw game and the identifier associated with the respective game ticket; and (d) the game controller configured for authorizing the game ticket having the selected game tokens for play and for communicating to the mobile computer device a verification of the game ticket.

18. The system as recited in claim 17, wherein the mobile computer device is configured with instructions that upon execution generates an encapsulated code representative of the game tokens selected by the player; and the mobile computer device communicates the encapsulated code.

19. The system as recited in claim 17, wherein the random draw game has at least one criteria and each criteria has at least two criteria options presented on the display for the player to select at least one of the criteria options for the game ticket.

20. The system as recited in claim 19, wherein one of the criteria for the random draw game comprises a quick-pick option by which the game tokens are selected randomly for the game ticket.

21. The system as recited in claim 20, further comprising the screen displaying the selected game tokens in a first representation; and upon the player selecting one of the selected game tokens to unselect and change the one of the selected game tokens to an available game token, the display changing the first representation of the unselected game token to a second representation.

22. The system as recited in claim 19, wherein the mobile computer device is configured with instructions that upon execution generate an encapsulated code representative of the criteria and of the game tokens selected by the player for the game ticket for play during the random draw game, wherein the mobile computer device communicates the criteria and game tokens as the encapsulated code.

23. The system as recited in claim 18, wherein the mobile computer device displays the encapsulated code on the screen and the player communicates the encapsulated code to the random draw game controller by presenting the displayed encapsulated code to a scanner at a game ticket terminal of a game ticket provider and a game ticket terminal of the game ticket provider communicating the scanned code to the game controller.

24. The system as recited in claim 23, further comprising a printer connected to the game ticket terminal for printing the selected game ticket upon instruction by the game controller.

25. The system as recited in claim 17, wherein the mobile computer device includes a communications device that communicates a digital representation of the selected game tokens to the random draw game controller maintaining the database of game tickets authorized for play during the random draw game for authorizing the game ticket selected by the player.

26. The system as recited in claim 25, wherein the game controller generates a unique authorization code for the game ticket and communicates the authorization code to the mobile computer device.

27. The system as recited in claim 26, wherein the authorization code is included with the game tokens in an encapsulated code communicated to the mobile computer device; and the mobile computer device stores the encapsulated code.

28. The system as recited in claim 18, wherein the screen is configured as a touchscreen device whereby the player selects one of the available game tokens displayed thereon in a first representation by touching the touchscreen display in alignment with the selected one of the game tokens, and the display screen changes the display of the selected one of the game tokens to a second representation.

29. The system as recited in claim 28, wherein the display of the first representation is a first color and the display of the second representation is second color.

30. The system as recited in claim 28, further comprising the mobile computer device configured for touch contact of one of the selected game tokens displayed on the screen to unselect and change the selected game token to an available game token, and the display changing the second representation of the unselected game token to the first representation.

31. The system as recited in claim 18, wherein the encapsulated code is a two-dimensional bar code.

32. The system as recited in claim 18, wherein the random draw game controller embeds an authorization code into the encapsulated code as a revised encapsulated code that is communicated to the mobile computer device that stores the revised encapsulated code in a memory device.

* * * * *